(12) United States Patent
Yokomizo

(10) Patent No.: US 10,171,747 B2
(45) Date of Patent: Jan. 1, 2019

(54) IMAGE CAPTURING APPARATUS, EXTERNAL APPARATUS, IMAGE CAPTURING SYSTEM, METHOD FOR CONTROLLING IMAGE CAPTURING APPARATUS, COMPUTER PROGRAM, AND COMPUTER-READABLE STORAGE MEDIUM

(71) Applicant: CANON KABUSHIKI KAISHA, Tokyo (JP)

(72) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/031,205

(22) PCT Filed: Oct. 21, 2014

(86) PCT No.: PCT/JP2014/005337
§ 371 (c)(1),
(2) Date: Apr. 21, 2016

(87) PCT Pub. No.: WO2015/064057
PCT Pub. Date: May 7, 2015

(65) Prior Publication Data
US 2016/0248958 A1    Aug. 25, 2016

(30) Foreign Application Priority Data

Oct. 28, 2013  (JP) .................................. 2013-223523

(51) Int. Cl.
*H04N 5/235*    (2006.01)
*H04N 5/44*    (2011.01)
(Continued)

(52) U.S. Cl.
CPC ........... *H04N 5/2355* (2013.01); *G03B 7/091* (2013.01); *H04N 5/2353* (2013.01);
(Continued)

(58) Field of Classification Search
CPC ........ H04N 5/2355; H04N 5/44; H04N 5/265; H04N 5/2353; H04N 5/23206; G03B 7/091
(Continued)

(56) References Cited

U.S. PATENT DOCUMENTS

2001/0045983 A1 * 11/2001 Okazaki ................ H04L 63/101
348/211.99
2004/0186694 A1 * 9/2004 Oya .................... G03G 15/5075
702/188
(Continued)

FOREIGN PATENT DOCUMENTS

CN    101272458 A    9/2008
CN    103108192 A    5/2013
(Continued)

*Primary Examiner* — Abdelaaziz Tissire
(74) *Attorney, Agent, or Firm* — Canon U.S.A., Inc. IP Division

(57) ABSTRACT

An image capturing apparatus to communicate with an external apparatus includes an image capturing unit, a receiving unit, a control unit, a determining unit, and a transmitting unit. The receiving unit receives, from the external apparatus, a synthesizing command for controlling an operation of synthesizing images that have been captured by the image capturing unit under different exposure conditions, and an exposure setting command for controlling an operation of obtaining an image that has been generated under a set exposure condition. The control unit controls an operation that is performed based on the synthesizing and exposure setting commands, where the receiving unit receives the synthesizing and exposure setting commands. The transmitting unit transmits, to the external apparatus, operation information indicating operations which are specifiable by the synthesizing command and the exposure setting command received by the receiving unit, in accordance with a determination result obtained from the determining unit.

20 Claims, 13 Drawing Sheets

(51) Int. Cl.
    *G03B 7/091*       (2006.01)
    *H04N 5/232*      (2006.01)
    *H04N 5/265*      (2006.01)

(52) U.S. Cl.
    CPC ......... *H04N 5/23206* (2013.01); *H04N 5/265* (2013.01); *H04N 5/44* (2013.01)

(58) Field of Classification Search
    USPC .......................................................... 725/105
    See application file for complete search history.

(56) References Cited

U.S. PATENT DOCUMENTS

| | | | | |
|---|---|---|---|---|
| 2005/0162525 | A1* | 7/2005 | Koshikawa | H04N 5/2353 348/211.99 |
| 2007/0104476 | A1* | 5/2007 | Yasutomi | H04N 1/0044 396/287 |
| 2008/0043108 | A1* | 2/2008 | Jung | H04N 5/232 348/207.1 |
| 2008/0122949 | A1* | 5/2008 | Kindborg | G08B 13/19671 348/231.99 |
| 2008/0297608 | A1* | 12/2008 | Border | H04N 1/00204 348/207.11 |
| 2009/0102945 | A1* | 4/2009 | Chen | H04N 5/2355 348/229.1 |
| 2009/0160970 | A1* | 6/2009 | Fredlund | H04N 5/232 348/229.1 |
| 2009/0251591 | A1* | 10/2009 | Whitham | H04N 5/2356 348/362 |
| 2010/0289910 | A1* | 11/2010 | Kamshilin | H04N 5/232 348/211.4 |
| 2012/0050549 | A1* | 3/2012 | Maekawa | H04N 1/00153 348/207.1 |
| 2013/0120606 | A1 | 5/2013 | Iwasaki | |
| 2014/0104444 | A1* | 4/2014 | Wu | H04N 5/232 348/207.99 |
| 2015/0109470 | A1* | 4/2015 | Yang | H04N 5/23209 348/211.9 |
| 2016/0295093 | A1* | 10/2016 | Yokomizo | G06F 3/04842 |
| 2016/0381276 | A1* | 12/2016 | Li | H04N 5/23206 348/211.3 |

FOREIGN PATENT DOCUMENTS

| | | |
|---|---|---|
| JP | 2003-299067 A | 10/2003 |
| JP | 2006-279233 A | 10/2006 |
| JP | 2007-228177 A | 9/2007 |
| JP | 2008-236142 A | 10/2008 |
| JP | 2012231273 A | 11/2012 |
| JP | 2013-162190 A | 8/2013 |

\* cited by examiner

FIG. 6A

```
<xs:complexType name="ImagingSettings20">
  <xs:sequence>
    <xs:element name="BacklightCompensation" type="tt:BacklightCompensation20" minOccurs="0"/>
    <xs:element name="Brightness" type="xs:float" minOccurs="0"/>
    <xs:element name="ColorSaturation" type="xs:float" minOccurs="0"/>
    <xs:element name="Contrast" type="xs:float" minOccurs="0"/>
    <xs:element name="Exposure" type="tt:Exposure20" minOccurs="0"/>
    <xs:element name="Focus" type="tt:FocusConfiguration20" minOccurs="0"/>
    <xs:element name="IrCutFilter" type="tt:IrCutFilterMode" minOccurs="0"/>
    <xs:element name="Sharpness" type="xs:float" minOccurs="0"/>
    <xs:element name="WideDynamicRange" type="tt:WideDynamicRange20" minOccurs="0"/>
    <xs:element name="WhiteBalance" type="tt:WhiteBalance20" minOccurs="0"/>
    <xs:element name="Extension" type="tt:ImagingSettingsExtension20" minOccurs="0"/>
  </xs:sequence>
  <xs:anyAttribute processContents="lax"/>
</xs:complexType>
```

FIG. 6B

```
<xs:complexType name="ImagingSettingsExtension20">
    <xs:sequence>
        <xs:any namespace="##other" processContents="lax" minOccurs="0" maxOccurs="unbounded"/>
        <xs:element name="ImageStabilization" type="tt:ImageStabilization" minOccurs="0"/>
        <xs:element name="Extension" type="tt:ImagingSettingsExtension202" minOccurs="0"/>
    </xs:sequence>
</xs:complexType>
```

FIG. 6C

```
<xs:complexType name="ImagingSettingsExtension202">
    <xs:sequence>
        <xs:element name="IrCutFilterAutoAdjustment" type="tt:IrCutFilterAutoAdjustment" minOccurs="0" maxOccurs="unbounded"/>
        <xs:element name="Extension" type="tt:ImagingSettingsExtension203" minOccurs="0"/>
    </xs:sequence>
</xs:complexType>
```

FIG. 6D

```
<xs:complexType name="ImagingSettingsExtension203">
    <xs:sequence>
        <xs:element name="DarkCompensation" type="tt:DarkCompensation" minOccurs="0" maxOccurs="unbounded"/>
        <xs:element name="Extension" type="tt:ImagingSettingsExtension204" minOccurs="0"/>
    </xs:sequence>
</xs:complexType>
```

FIG. 6E

```
<xs:complexType name="ImagingSettingsExtension204">
  <xs:sequence>
    <xs:any namespace="##targetNamespace" processContents="lax" minOccurs="0" maxOccurs="unbounded"/>
  </xs:sequence>
</xs:complexType>
```

IMAGE CAPTURING APPARATUS, EXTERNAL APPARATUS, IMAGE CAPTURING SYSTEM, METHOD FOR CONTROLLING IMAGE CAPTURING APPARATUS, COMPUTER PROGRAM, AND COMPUTER-READABLE STORAGE MEDIUM

TECHNICAL FIELD

The present invention relates to an image capturing apparatus, an external apparatus, an image capturing system, a method for controlling an image capturing apparatus, a computer program, and a computer-readable storage medium. In particular, an embodiment of the present invention is applicable to an interface for controlling an operation of a function of correcting image data obtained by capturing an image of a subject.

BACKGROUND ART

There is a technique of capturing an image of a subject having a great difference between light regions and dark regions, without causing overexposure or underexposure.

An example of such a technique is a wide dynamic range process, in which a plurality of images are synthesized together to widen the dynamic range of the synthesized image obtained through the synthesizing. PTL 1 discloses an image capturing apparatus that synthesizes a plurality of images obtained under different exposure times, thereby generating an image having a dynamic range wider than an ordinary dynamic range.

Another example of the technique is a dodging process in silver halide photography, which is performed in a darkroom to obtain a photo of a wide dynamic range. The dodging process may be implemented using digital image processing (digital dodging process), in which a subject having a great difference between light regions and dark regions, particularly a backlit subject, is corrected. In a digital dodging process, the gain and so forth of an image is changed to adjust the intensity of light and dark regions.

Also, there is an image capturing apparatus that applies image processing of compensating for exposure to a single piece of image data and outputs image data in which a subject can be easily identified.

With the rapid proliferation of network technologies, users' needs for controlling an image capturing apparatus from an external apparatus via a network have been increasing.

Here, it is assumed that there is an image capturing apparatus that has a function of performing both the above-described wide dynamic range process and digital dodging process and that is incapable of simultaneously performing both of these processes due to constraints of the configuration of an image processing module. Also, it is assumed that there is an external apparatus that transmits, to the image capturing apparatus via a network, a command for implementing the wide dynamic range process and a command for implementing the digital dodging process.

Under these assumptions, there is a probability that, if a user of the external apparatus is allowed to freely transmit these commands to the image capturing apparatus, the image capturing apparatus is incapable of normally processing the commands.

CITATION LIST

Patent Literature

PTL 1: Japanese Patent Laid-Open No. 2008-236142

SUMMARY OF INVENTION

According to an embodiment of the present invention, a user is provided with, among options for specifying operations of a synthesizing unit and an exposure setting unit, options with which an image capturing apparatus that selectively operates the synthesizing unit or the exposure setting unit performs normal processing without making an error response, and thereby convenience of the user is increased.

According to an embodiment of the present invention, an image capturing apparatus capable of communicating with an external apparatus via a network includes an image capturing unit, a receiving unit configured to receive, from the external apparatus via the network, a synthesizing command for controlling an operation of synthesizing a plurality of images that have been captured by the image capturing unit under different exposure conditions, and an exposure setting command for controlling an operation of obtaining an image that has been generated under a set exposure condition, a control unit configured to control an operation that is performed based on the synthesizing command and the exposure setting command, in a case where the receiving unit receives the synthesizing command and the exposure setting command, a determining unit configured to determine the operation controlled by the control unit, and a transmitting unit configured to transmit, to the external apparatus via the network, operation information indicating operations which are specifiable by the synthesizing command and the exposure setting command received by the receiving unit, in accordance with a determination result obtained from the determining unit.

Further features of the present invention will become apparent from the following description of exemplary embodiments with reference to the attached drawings.

BRIEF DESCRIPTION OF DRAWINGS

FIG. 6A is a diagram illustrating an example of definition of an ImagingSettings type according to the first embodiment of the present invention.

FIG. 6B is a diagram illustrating an example of definition of an ImagingSettings type according to the first embodiment of the present invention.

FIG. 6C is a diagram illustrating an example of definition of an ImagingSettings type according to the first embodiment of the present invention.

FIG. 6D is a diagram illustrating an example of definition of an ImagingSettings type according to the first embodiment of the present invention.

FIG. 6E is a diagram illustrating an example of definition of an ImagingSettings type according to the first embodiment of the present invention.

DESCRIPTION OF EMBODIMENTS

Figure 1:
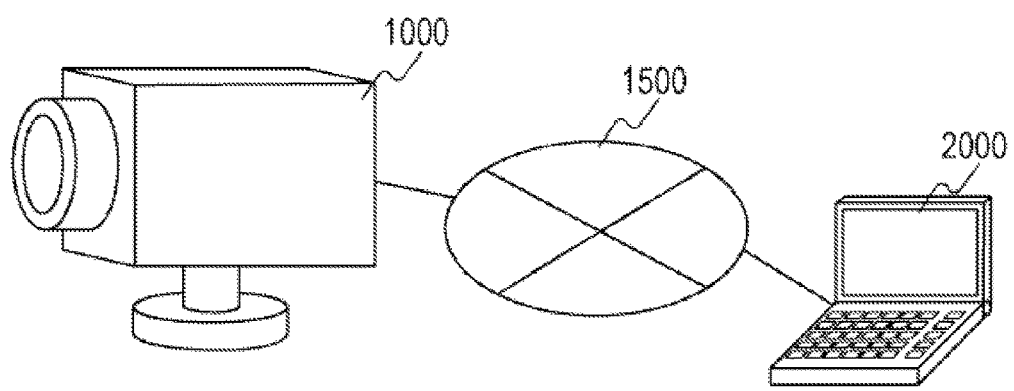
FIG. 1 is a diagram illustrating an example of the configuration of a monitoring system according to a first embodiment of the present invention.

Hereinafter, embodiments of the present invention will be described in detail with reference to the attached drawings. The configurations described in the following embodiments are merely examples, and the present invention is not limited to the configurations illustrated in the drawings. It is assumed that a command and a coordinate system according to the following embodiments are determined based on, for example, the standard of Open Network Video Interface Forum (ONVIF).

First Embodiment

Hereinafter, a network configuration according to a first embodiment will be described with reference to FIG. 1. More specifically, FIG. 1 is a diagram illustrating an example of the configuration of a monitoring system according to the first embodiment.

In the monitoring system according to the first embodiment, a monitoring camera 1000 that captures a moving image and a client apparatus 2000 are connected to each other such that both are capable of communicating with each other via an Internet protocol (IP) network 1500 (via a network). Accordingly, the monitoring camera 1000 is capable of distributing image data to the client apparatus 2000 via the IP network 1500.

The client apparatus 2000 according to this embodiment is an example of an external apparatus, such as a personal computer (PC). The monitoring system according to this embodiment corresponds to an image capturing system.

The IP network 1500 is constituted by a plurality of routers, switches, cables, and so forth that satisfy the communication standard of Ethernet (registered trademark) or the like. In this embodiment, however, the standard, scale, and configuration of communication are not specified as long as the monitoring camera 1000 and the client apparatus 2000 are capable of communicating with each other.

For example, the IP network 1500 may be constituted by the Internet, a wired local area network (LAN), a wireless LAN, a wide area network (WAN), or the like. The monitoring camera 1000 according to this embodiment may be compatible with, for example, power over Ethernet (PoE), and power may be supplied via a LAN cable.

The client apparatus 2000 transmits various commands to the monitoring camera 1000. Examples of the various commands include a command for changing an image capturing direction and an angle view of the monitoring camera 1000, a command for changing an image capturing parameter, and a command for starting image streaming.

On the other hand, the monitoring camera 1000 transmits responses to these commands and image streaming to the client apparatus 2000. Also, the monitoring camera 1000 changes an angle of view in response to a command for changing an angle of view received from the client apparatus 2000.

Figure 2:
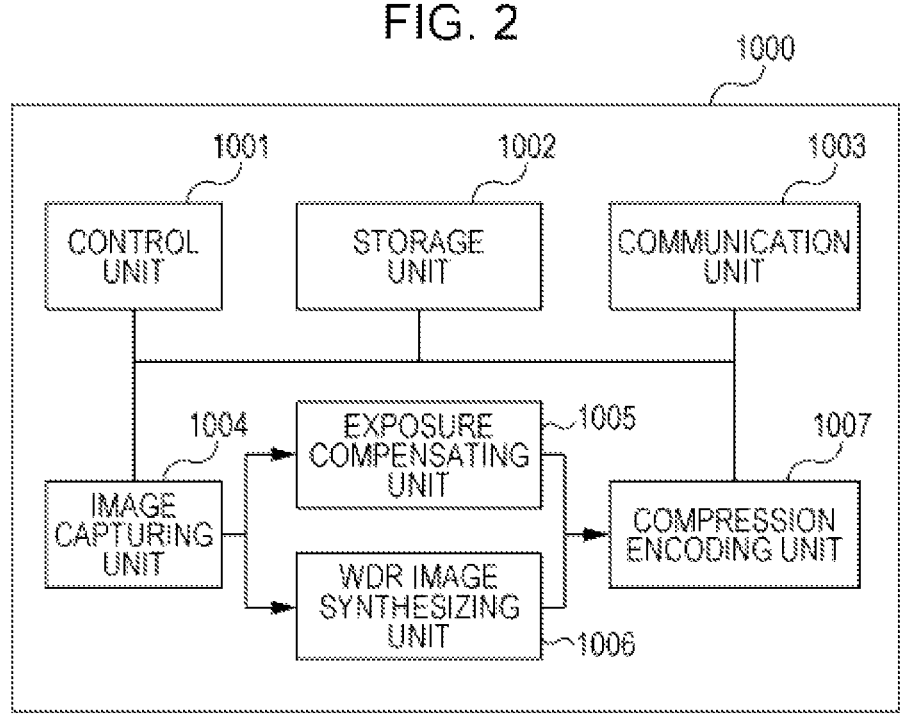
FIG. 2 is a diagram illustrating an example of the hardware configuration of a monitoring camera according to the first embodiment of the present invention.

FIG. 2 is a diagram illustrating an example of the hardware configuration of the monitoring camera 1000 according to this embodiment.

A control unit 1001 illustrated in FIG. 2 controls the individual elements of the monitoring camera 1000 in a centralized manner. The control unit 1001 is constituted by a central processing unit (CPU). The control unit 1001 executes a program stored in a storage unit 1002. The control unit 1001 may perform control using hardware.

The storage unit 1002 is mainly used as a storage region for various pieces of data, such as a storage region for a program executed by the control unit 1001, a working area used while a program is being executed, and a storage region for image data generated by an image capturing unit 1004, which will be described below. A communication unit 1003 receives each control command from the client apparatus 2000. Also, the communication unit 1003 transmits each control command to the client apparatus 2000.

The image capturing unit 1004 is constituted by an image capturing optical system and an image capturing device such as a charge-coupled device (CCD) or a complementary metal-oxide semiconductor (CMOS) sensor (not illustrated). The image capturing unit 1004 captures an image of a subject formed by the image capturing optical system, and thereby generates an analog signal. The image capturing unit 1004 converts the generated analog signal into digital data.

Further, the image capturing unit 1004 outputs the digital data as image data obtained through the conversion to the storage unit 1002, an exposure compensating unit 1005, and a wide dynamic range image synthesizing unit 1006.

The exposure compensating unit 1005 analyzes the image data output from the image capturing unit 1004, and performs an exposure compensation process on the image data in accordance with an image processing setting. Also, the exposure compensating unit 1005 outputs the image data that has been subjected to the exposure compensation process to the storage unit 1002.

The exposure compensation process according to this embodiment includes image processing, such as a backlight compensation process and a dark portion compensation process. Here, the backlight compensation process is a process of brightening the entire image data including a dark portion under a backlit situation. The dark portion compensation process is a process of determining a dark portion included in the image data and brightening the determined dark portion while maintaining the brightness of a light portion.

The exposure compensation process according to this embodiment has an exposure setting function of setting exposure conditions of the image capturing unit 1004. Here, the exposure conditions include the value of an aperture of the image capturing optical system included in the image capturing unit 1004, an exposure time (accumulation time) of the image capturing device included in the image capturing unit 1004, and so forth.

The exposure compensating unit 1005 according to this embodiment corresponds to an exposure setting unit that sets exposure conditions of the image capturing unit 1004, and obtains a piece of image data generated by capturing, with the image capturing unit 1004, an image of a subject under the set exposure conditions.

The monitoring camera 1000 also includes the wide dynamic range image synthesizing unit 1006. Hereinafter, a wide dynamic range may be abbreviated as WDR, and a wide dynamic range image synthesizing process may be abbreviated as a WDR process.

The WDR image synthesizing unit 1006 determines portions of optimal brightness of a plurality of images that have been output from the image capturing unit 1004 and that have different exposure conditions, and synthesizes the plurality of images, so as to generate a piece of synthesized image data having a wide dynamic range. Also, the WDR image synthesizing unit 1006 outputs the generated synthesized image data to the storage unit 1002.

The exposure conditions according to this embodiment include an exposure time (accumulation time) of the image capturing device included in the image capturing unit 1004. The WDR image synthesizing unit 1006 according to this embodiment corresponds to a synthesizing unit that synthesizes a plurality of pieces of image data generated by capturing, with the image capturing unit 1004, images of a subject under different exposure conditions, and thereby generates synthesized image data. On the other hand, the exposure compensating unit 1005 according to this embodiment does not synthesize the plurality of pieces of image data.

A compression encoding unit 1007 performs a compression encoding process on the image data output from the image capturing unit 1004, the exposure compensating unit 1005, and the WDR image synthesizing unit 1006, in accordance with a compression encoding setting and the standard of JPEG, H.264, H.265, or the like. Also, the compression encoding unit 1007 outputs the image data that has been subjected to the compression encoding process to the storage unit 1002.

When receiving a request for streaming distribution from the client apparatus 2000, the monitoring camera 1000 according to this embodiment distributes, by streaming distribution, the image data output from the compression encoding unit 1007 to the outside via the communication unit 1003, in response to the request.

Figure 3:
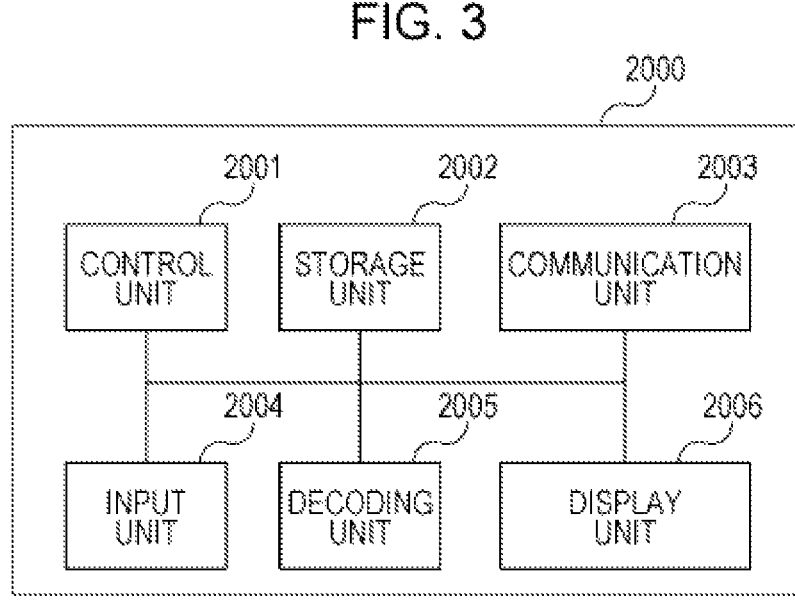
FIG. 3 is a diagram illustrating an example of the hardware configuration of a client apparatus according to the first embodiment of the present invention.

FIG. 3 is a diagram illustrating an example of the hardware configuration of the client apparatus 2000 according to this embodiment. The client apparatus 2000 according to this embodiment is configured as a computer apparatus that is connected to the IP network 1500.

Referring to FIG. 3, a control unit 2001 controls the entire client apparatus 2000. The control unit 2001 is constituted by, for example, a CPU, and executes a program stored in a storage unit 2002 (described below). Alternatively, the control unit 2001 may perform control using hardware. The storage unit 2002 is used as a storage region for a program executed by the control unit 2001, a working area used while a program is being executed, and a storage region for data.

A communication unit 2003 receives an instruction from the control unit 2001 and transmits a command or the like to the monitoring camera 1000. Also, the communication unit 2003 receives a response to a command, image data distributed by streaming distribution, and so forth from the monitoring camera 1000.

The input unit 2004 is constituted by, for example, a button, a cross key, a touch panel, a mouse, and the like. The input unit 2004 receives input of an instruction from a user. For example, the input unit 2004 is capable of receiving, as an instruction from a user, input of an instruction to transmit various commands to the monitoring camera 1000.

When receiving a command transmission instruction for the monitoring camera 1000 from a user, the input unit 2004 notifies the control unit 2001 of the input of the command transmission instruction. In response to the instruction input to the input unit 2004, the control unit 2001 generates a command for the monitoring camera 1000. Subsequently, the control unit 2001 instructs the communication unit 2003 to transmit the generated command to the monitoring camera 1000.

Further, the input unit 2004 is capable of receiving input of a user's response to an inquiry message to the user, the inquiry message being generated by executing, with the control unit 2001, a program stored in the storage unit 2002.

A decoding unit 2005 decodes and decompresses the image data output from the communication unit 2003. Subsequently, the decoding unit 2005 outputs the decoded and decompressed image data to a display unit 2006. Accordingly, the display unit 2006 displays an image corresponding to the image data output from the decoding unit 2005.

The display unit 2006 is capable of displaying an inquiry message or the like to the user, generated by executing, with the control unit 2001, a program stored in the storage unit 2002.

The internal configurations of the monitoring camera 1000 and the client apparatus 2000 have been described above. The processing blocks illustrated in FIGS. 2 and 3 describe the image capturing apparatus and external apparatus according to an embodiment of the present invention, and the present invention is not limited to these configurations. Various modifications and changes can be implemented within the gist of the present invention. For example, an audio input unit and an audio output unit may be provided.

Figure 4:
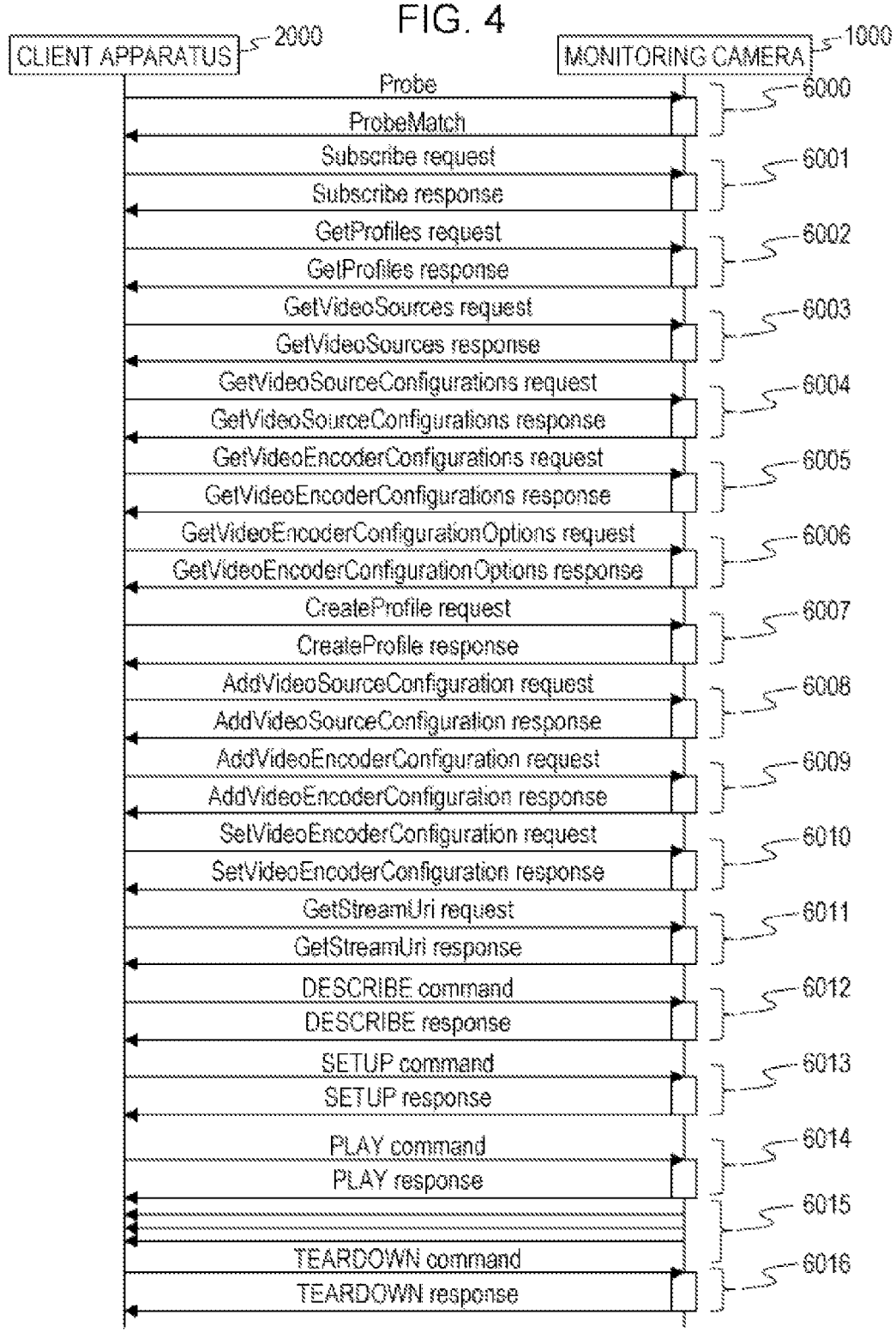
FIG. 4 is a sequence diagram describing a command sequence of the monitoring camera and the client apparatus according to the first embodiment of the present invention.

FIG. 4 is a sequence diagram describing a typical command sequence between the monitoring camera 1000 and the client apparatus 2000 from when the setting of a parameter of an image that is to be distributed by streaming distribution starts to when the image is distributed by streaming distribution.

In this embodiment, the term "transaction" means a pair of a command transmitted from the client apparatus 2000 to the monitoring camera 1000 and a response transmitted from the monitoring camera 1000 to the client apparatus 2000.

In FIG. 4, reference numeral 6000 denotes a transaction for connecting a network device. The client apparatus 2000 transmits a Probe command for connecting a network device to the IP network 1500 by unicasting or multicasting. The monitoring camera 1000 connected to the network transmits a ProbeMatch response, indicating that a command is acceptable, to the client apparatus 2000.

Reference numeral 6001 denotes a transaction for Subscribe. With this transaction, the client apparatus 2000 is capable of instructing the monitoring camera 1000 to perform event distribution.

Reference numeral 6002 denotes a GetProfiles transaction. This transaction is a transaction for obtaining MediaProfile corresponding to a distribution profile. Here, MediaProfile is a parameter set for storing various setting items of the monitoring camera 100 in association with one another.

The various setting items include ProfileToken, which is an ID of MediaProfile, VideoSourceConfiguration (described below), VideoEncoderConfiguration (described below), and an audio encoder or the like. MediaProfile holds a link to these various setting items.

The client apparatus 2000 transmits a GetProfiles command to the monitoring camera 1000. The monitoring camera 1000 that has received the GetProfiles command transmits a list of MediaProfile to the client apparatus 2000.

Accordingly, the client apparatus 2000 obtains a distribution profile ID for identifying MediaProfile, and a list of MediaProfile currently available in the monitoring camera 1000. The client apparatus 2000 identifies, using the distribution profile ID, the setting of a distribution profile that exists in the monitoring camera 1000 and that can be distributed.

Reference numeral 6003 denotes a transaction of a GetVideoSources command. With this command, the client apparatus 2000 obtains a list of VideoSources stored by the monitoring camera 1000.

Here, VideoSource is a set of parameters indicating the performance of one image capturing unit 1004 included in the monitoring camera 1000. VideoSource includes VideoSourceToken which is an ID of VideoSource, and Resolution indicating the resolution of image data that can be output by the image capturing unit 1004.

The client apparatus 2000 transmits a GetVideoSources command to the monitoring camera 1000. The monitoring camera 1000 that has received the GetVideoSources command transmits a response to this command to the client apparatus 2000.

Reference numeral 6004 denotes a GetVideoSourceConfigurations transaction. This transaction is a transaction for obtaining a list of VideoSourceConfigurations stored by the monitoring camera 1000.

Here, VideoSourceConfiguration is a set of parameters for associating VideoSource stored by the monitoring camera 1000 with MediaProfile. VideoSourceConfiguration includes Bounds, which specifies a portion to be cut out as an image to be distributed in the image data output from VideoSource.

Hereinafter, VideoSourceConfiguration may be referred to as VSC.

The client apparatus 2000 transmits a GetVideoSourceConfigurations command to the monitoring camera 1000. The monitoring camera 1000 that has received the GetVideoSourceConfigurations command transmits a list including an ID of VSC stored by the monitoring camera 1000 to the client apparatus 2000.

Reference numeral 6005 denotes a GetVideoEncoderConfigurations transaction. With this transaction, the client apparatus 2000 obtains a list of VideoEncoderConfigurations stored by the monitoring camera 1000.

The client apparatus 2000 transmits a GetVideoEncoderConfigurations command to the monitoring camera 1000. The monitoring camera 1000 that has received this command transmits a response to this command.

Here, VideoEncoderConfiguration is a set of parameters for associating an encoder setting regarding compression encoding of image data with MediaProfile. Hereinafter, VideoEncoderConfiguration may be referred to as VEC.

VEC includes VEC Token which is an ID of VEC, Encoding which specifies a compression encoding scheme (JPEG, H.264, or the like), Resolution which specifies the resolution of an output image, and Quality which specifies compression encoding quality. Further, VEC includes FramerateLimit which specifies a maximum frame rate, and BitrateLimit which specifies a maximum bit rate, regarding the image data output from the monitoring camera 1000.

For example, the monitoring camera 1000 compresses and encodes the image data that has been output based on VideoSource and VSC in accordance with the parameters set in the VEC, and distributes the image data to the client apparatus 2000 via the communication unit 1003.

Reference numeral 6006 denotes a GetVideoEncoderConfigurationOptions transaction. With this transaction, the client apparatus 2000 is capable of obtaining options of individual parameters and ranges of setting values thereof acceptable by the monitoring camera 1000, regarding the VEC specified by an ID.

The client apparatus 2000 transmits a GetVideoEncoderConfigurationOptions command to the monitoring camera 1000. The monitoring camera 1000 that has received this command transmits a response to this command. With this transaction, the client apparatus 2000 obtains, from the monitoring camera 1000, a list including an ID of a compression encoding setting stored in the storage unit 1002.

Reference numeral 6007 denotes a transaction of CreateProfile. This transaction is a transaction for requesting creation of a distribution profile. The client apparatus 2000 transmits a CreateProfile command to the monitoring camera 1000. The monitoring camera 1000 that has received this command transmits a response to this command.

With this transaction, the client apparatus 2000 is capable of newly creating a distribution profile in the monitoring camera 1000, and obtaining an ID of the created distribution profile. The monitoring camera 1000 stores the newly created distribution profile.

After the command process for this transaction has been performed, the monitoring camera 1000 transmits a MediaProfile change notification event to the client apparatus 2000, and thereby notifies the client apparatus 2000 that MediaProfile has been changed.

Reference numeral 6008 denotes a transaction of AddVideoSourceConfiguration. This transaction is a transaction for requesting addition of VSC. The client apparatus 2000 transmits a command of AddVideoSourceConfiguration to the monitoring camera 1000. The monitoring camera 1000 that has received this command transmits a response to this command to the client apparatus 2000.

In this transaction, the client apparatus 2000 specifies the ID of the distribution profile obtained in the transaction 6007 and the ID of VSC obtained in the transaction 6004. Accordingly, the client apparatus 2000 is capable of associating desired VSC corresponding to the specified ID of VSC with MediaProfile corresponding to the specified ID of the distribution profile.

On the other hand, the monitoring camera 1000 stores MediaProfile corresponding to the ID of the distribution profile specified by the client apparatus 2000 and the desired VSC corresponding to the ID of VSC specified by the client apparatus 2000 in association with each other.

Reference numeral 6009 denotes a transaction of AddVideoEncoderConfiguration. This transaction is a transaction for requesting addition of VEC. The client apparatus 2000 transmits a command of AddVideoEncoderConfiguration to the monitoring camera 1000. The monitoring camera 1000 transmits a response to this command to the client apparatus 2000.

In this transaction, the client apparatus 2000 specifies the ID of the distribution profile obtained in the transaction 6007 and the ID of VEC obtained in the transaction 6005. Accordingly, the client apparatus 2000 is capable of associating VEC corresponding to the specified ID of VEC with MediaProfile corresponding to the specified ID of the distribution profile.

On the other hand, the monitoring camera 1000 stores MediaProfile corresponding to the ID of the distribution profile specified by the client apparatus 2000 and the desired VEC corresponding to the ID of VEC specified by the client apparatus 2000 in association with each other.

After the transactions 6008 and 6009, the monitoring camera 1000 transmits a MediaProfile change notification event to the client apparatus 2000, and thereby notifies the client apparatus 2000 that MediaProfile has been changed.

Reference numeral 6010 denotes a transaction of SetVideoEncoderConfiguration. This transaction is a transaction for setting individual parameters of VEC. The client apparatus 2000 transmits a command of SetVideoEncoderConfiguration to the monitoring camera 1000.

The monitoring camera 1000 that has received this command transmits a response to this command. With this transaction, the client apparatus 2000 sets the content of the VEC obtained in the transaction 6005 in accordance with the options obtained in the transaction 6006. For example, the client apparatus 2000 changes a compression encoding scheme and a cutout size. The monitoring camera 1000 stores the details of the setting of compressed encoding and so forth.

After this transaction, the monitoring camera 1000 transmits a VEC change notification event to the client apparatus 2000, and thereby notifies the client apparatus 2000 that VEC has been changed.

Reference numeral 6011 denotes a transaction of GetStreamUri. This transaction is a transaction for requesting acquisition of a distribution address. With this transaction, the client apparatus 2000 specifies the ID of the distribution profile obtained in the transaction 6007, and obtains an address (URI) for obtaining an image or the like distributed by streaming distribution in accordance with the setting of the specified distribution profile.

The monitoring camera 1000 transmits, to the client apparatus 2000, an address for distributing, by streaming distribution, an image corresponding to the content of VSC and VEC associated with the ID of the distribution profile specified by the client apparatus 2000.

Reference numeral 6012 denotes a transaction of DESCRIBE. This transaction is a transaction for requesting acquisition of distribution information. The client apparatus 2000 transmits a command of DESCRIBE to the monitoring camera 1000. The monitoring camera 1000 that has received this command transmits a response to this command to the client apparatus 2000.

In this transaction, the client apparatus 2000 executes the DESCRIBE command using the URI obtained in the transaction 6011, and thereby requests and obtains information about the content to be distributed by streaming distribution by the monitoring camera 1000.

Reference numeral 6013 denotes a transaction of SETUP. This transaction is a transaction for requesting distribution setting. The client apparatus 2000 transmits a command of SETUP to the monitoring camera 1000. The monitoring camera 1000 that has received this command transmits a response to this command to the client apparatus 2000.

In this transaction, the client apparatus 2000 causes the monitoring camera 1000 to prepare for streaming in accordance with detailed data about the distribution information obtained in the transaction 6012. With the execution of this command, a transmission method for a stream including a session number is shared between the client apparatus 2000 and the monitoring camera 1000.

Reference numeral 6014 denotes a transaction of PLAY. This transaction is a transaction for starting streaming distribution. The client apparatus 2000 transmits a command of PLAY to the monitoring camera 1000. The monitoring camera 1000 that has received this command transmits a response to this command to the client apparatus 2000.

When transmitting the command of PLAY to the monitoring camera 1000, the client apparatus 2000 uses the session number obtained in the transaction 6013, and is thereby capable of requesting start of streaming to the monitoring camera 1000.

Reference numeral 6015 denotes a stream distributed from the monitoring camera 1000 to the client apparatus 2000. The stream for which start of distribution is requested in the transaction 6014 is distributed using the transmission method shared in the transaction 6013.

Reference numeral 6016 denotes a transaction of TEARDOWN. This transaction is a transaction for stopping distribution. The client apparatus 2000 transmits a command of TEARDOWN to the monitoring camera 1000. The monitoring camera 1000 that has received this command transmits a response to this command.

In this transaction, the client apparatus 2000 executes the TEARDOWN command by specifying the session number obtained in the transaction 6013, and is thereby capable of requesting stop of streaming to the monitoring camera 1000.

Figure 5:
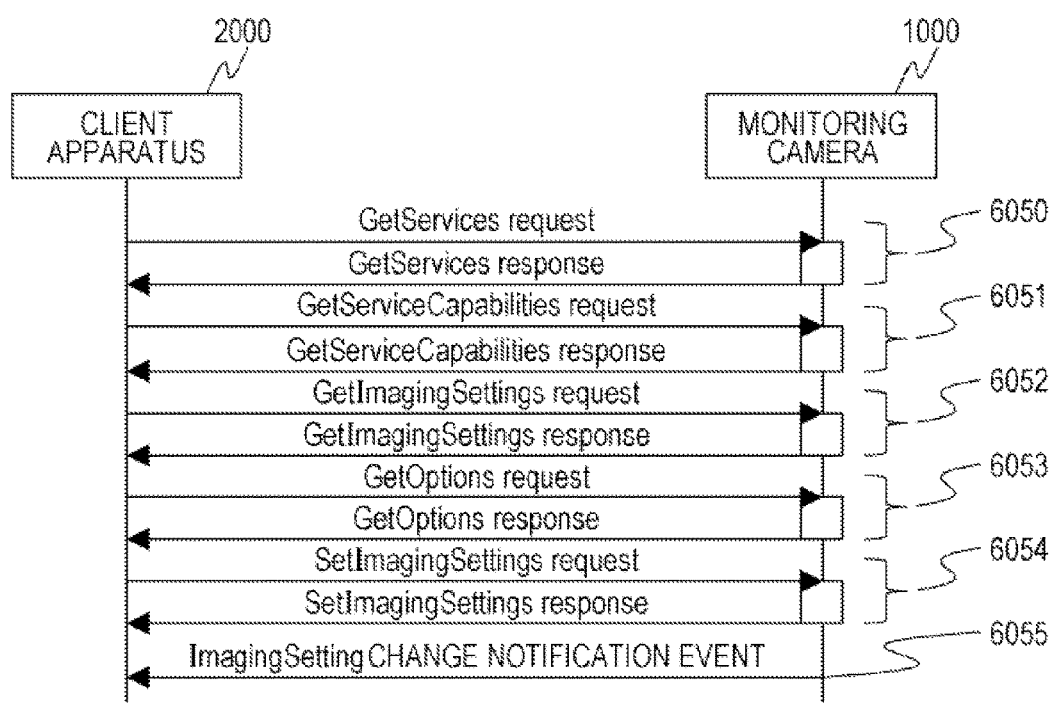
FIG. 5 is a sequence diagram describing a command sequence of the monitoring camera and the client apparatus according to the first embodiment of the present invention.

FIG. 5 is a sequence diagram describing a typical command sequence between the monitoring camera 1000 and the client apparatus 2000, for changing ImagingSetting corresponding to setting of image processing.

In FIG. 5, reference numeral 6050 denotes a transaction of GetServices. With this transaction, the client apparatus 2000 is capable of obtaining the types of web services supported by the monitoring camera 1000 and addresses URI for utilizing the individual web services.

The client apparatus 2000 transmits a GetServices command to the monitoring camera 1000. The monitoring camera 1000 that has received this command transmits a response to this command.

Reference numeral 6051 denotes a transaction of GetServiceCapabilities. With this transaction, the client apparatus 2000 is capable of obtaining a list of functions of the individual web services obtained in the transaction 6050.

The client apparatus 2000 transmits a command of GetServiceCapabilities to the monitoring camera 1000. The monitoring camera 1000 that has received this command transmits a response to this command.

Reference numeral 6052 denotes a transaction of GetImagingSettings. With this transaction, the client apparatus 2000 is capable of obtaining a list of ImagingSettings stored by the monitoring camera 1000.

The client apparatus 2000 transmits a command of GetImagingSettings to the monitoring camera 1000. The monitoring camera 1000 that has received this command transmits a response to this command.

Reference numeral 6053 denotes a transaction of GetOptions. With this transaction, the client apparatus 2000 is capable of obtaining options that are acceptable by the monitoring camera 1000 regarding the parameters of ImagingSettings.

The client apparatus 2000 transmits a command of GetOptions to the monitoring camera 1000. The monitoring camera 1000 that has received this command transmits a response to this command.

Reference numeral 6054 denotes a transaction of SetImagingSettings. With this transaction, the client apparatus 2000 transmits new ImagingSettings to the monitoring camera 1000, and is thereby capable of changing the details of ImagingSettings.

Reference numeral 6055 denotes an ImagingSetting change notification event. After the command process in the transaction 6054, the monitoring camera 1000 transmits an ImagingSetting change notification event to the client apparatus 2000, and thereby notifies the client apparatus 2000 that ImagingSettings has been changed.

FIGS. 6A to 6E are diagrams describing an example of definition of an ImagingSettings type. In this embodiment, an XML Schema Definition language (hereinafter referred to as XSD), which is used in the ONVIF standard, is used to define the ImagingSettings type.

In this embodiment, each of the response in the transaction 6052 and the command in the transaction 6054 in FIG. 5 includes data of the ImagingSettings type illustrated in FIGS. 6A to 6E.

FIG. 6A illustrates the content of the ImagingSettings type. In FIG. 6A, a sequence specifier specifies that the order of the elements in FIG. 6A emerges in accordance with the definition.

In FIG. 6A, "BacklightCompensation" (hereinafter referred to as BLC) is a parameter for turning ON/OFF backlight compensation. BLC may be omitted by a minOccurs specifier of XSD.

"Brightness" is a parameter for specifying the brightness of an image captured by the image capturing unit 1004. "Brightness" may be omitted by a minOccurs specifier of XSD. "ColorSaturation" is a parameter for specifying the color saturation of an image captured by the image capturing unit 1004. "ColorSaturation" may be omitted by a minOccurs specifier of XSD.

"Contrast" is a parameter for specifying the density of color of an image captured by the image capturing unit 1004. "Contrast" may be omitted by a minOccurs specifier of XSD. "Exposure" is a parameter for changing the exposure of an image captured by the image capturing unit 1004. "Exposure" may be omitted by a minOccurs specifier of XSD.

"Focus" is a parameter for changing the focus setting of the image capturing unit 1004. "Focus" may be omitted by a minOccurs specifier of XSD. "IrCutFilter" is a parameter for changing the setting of an infrared cut filter (IRCF) that can be inserted into and removed from the optical path of the image capturing optical system included in the image capturing unit 1004.

Here, the IRCF is a filter for cutting off infrared rays. "IrCutFilter" may be omitted by a minOccurs specifier of XSD.

"Sharpness" is a parameter for changing the setting of sharpness of an image captured by the image capturing unit 1004. "Sharpness" may be omitted by a minOccurs specifier of XSD.

"WideDynamicRange" is a parameter for changing the setting of a WDR process performed by the WDR image synthesizing unit 1006. ON or OFF can be set as the value of "WideDynamicRange". "WideDynamicRange" may be omitted by a minOccurs specifier of XSD.

"WideDynamicRange" whose value has been set to ON indicates that the monitoring camera 1000 is caused to perform a WDR process. "WideDynamicRange" whose value has been set to OFF indicates that the monitoring camera 1000 is caused to stop a WDR process. Thus, a command of SetImagingSettings according to this embodiment corresponds to a synthesizing command for controlling the operation of the WDR image synthesizing unit 1006.

"WhiteBalance" is a parameter for adjusting the white balance of an image captured by the image capturing unit 1004. "WhiteBalance" may be omitted by a minOccurs specifier of XSD. "Extension" includes an extended parameter illustrated in FIG. 6B. "Extension" may be omitted by a minOccurs specifier of XSD.

FIGS. 6B to 6E illustrate parameters that are added to ImagingSettings illustrated in FIG. 6A. These parameters are part of an image processing setting, like the individual parameters illustrated in FIG. 6A.

"ImageStabilization" in FIG. 6B is a parameter for setting a vibration isolation function of an image captured by the image capturing unit 1004. In FIG. 6B, a sequence specifier specifies that the order of the elements in FIG. 6B emerges in accordance with the definition.

"IrCutFilterAutoAdjustment" in FIG. 6C is a parameter for setting information (brightness of a subject, delay time, etc.) used for inserting or removing IRCF. In FIG. 6C, a sequence specifier specifies that the order of the elements in FIG. 6C emerges in accordance with the definition.

Each of "ImageStabilization" and "IrCutFilterAutoAdjustment" may be omitted by a minOccurs specifier of XSD.

"DarkCompensation" in FIG. 6D is a parameter for setting a dark portion compensation function of detecting a dark portion and a light portion of an image captured by the image capturing unit 1004 and compensating for only the dark portion to increase the brightness by the exposure compensating unit 1005. In FIG. 6D, a sequence specifier specifies that the order of the elements in FIG. 6D emerges in accordance with the definition.

Hereinafter, "DarkCompensation" may be referred to as DC. "DarkCompensation" may be omitted by a minOccurs specifier of XSD.

ON, OFF, or AUTO may be set as the value of DC. Here, DC whose value has been set to ON indicates that the monitoring camera 1000 is caused to turn ON the dark portion compensation function. DC whose value has been set to OFF indicates that the monitoring camera 1000 is caused to turn OFF the dark portion compensation function. Further, DC whose value has been set to AUTO indicates that the monitoring camera 1000 is caused to automatically determine ON or OFF of the dark portion compensation function.

Thus, a command of SetImagingSettings according to this embodiment corresponds to an exposure setting command for controlling the operation of the exposure compensating unit 1005.

In the monitoring camera 1000 according to this embodiment, either of ON and OFF can be set as the values of WDR and BLC. In other words, options for WDR and options for BLC are ON and OFF. On the other hand, any one of ON, OFF, and AUTO can be set as the value of DC. In other words, options for DC are ON, OFF, and AUTO.

Thus, in the transaction 6053 of GetOptions, the above-described options for WDR, BLC, and DC are transmitted as settable parameters to the client apparatus 2000.

In the transaction 6054 of SetImagingSettings, a Level 1 parameter for specifying an effective intensity can be added to WDR whose value is ON. In this specification, however, a description of Level 1 is omitted. Likewise, in this transaction, a Level 1 parameter for specifying an effective intensity can be added to DC whose value is ON. In this specification, however, a description of Level 1 is omitted.

Figure 7:
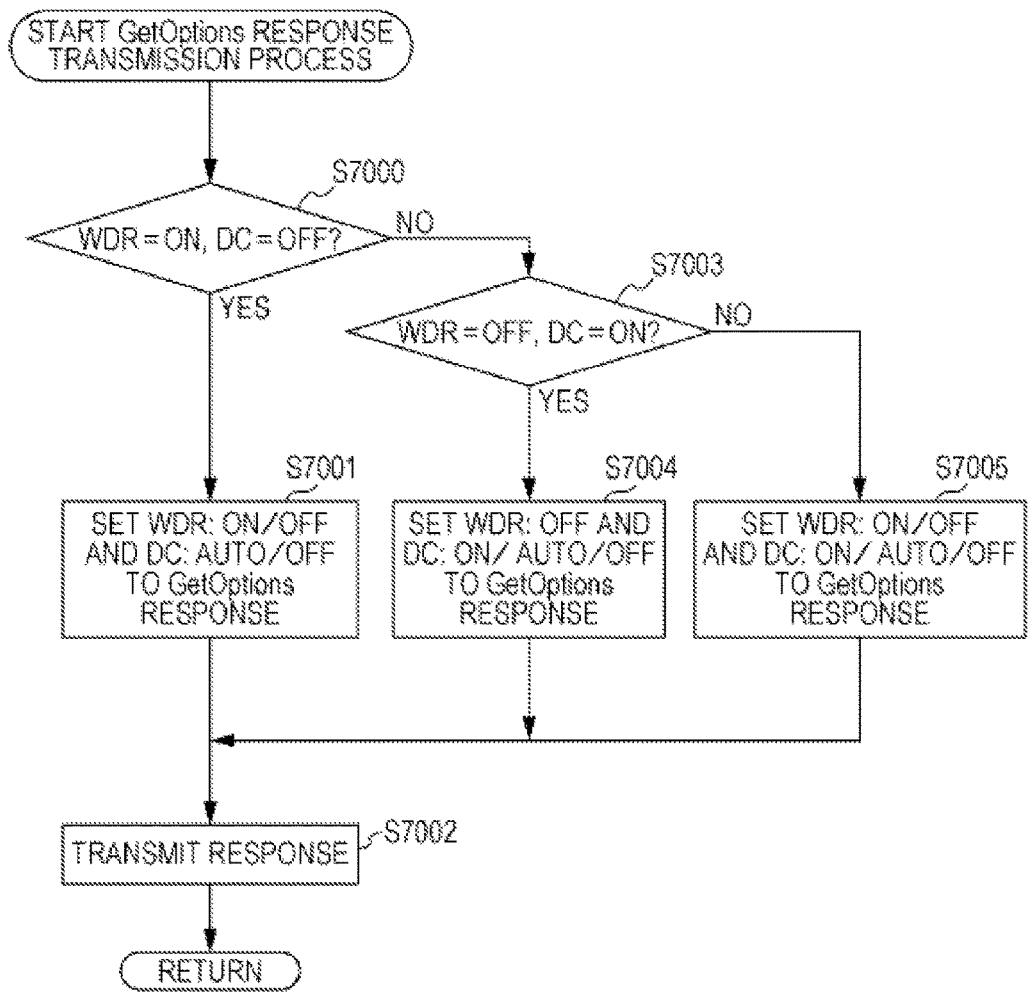
FIG. 7 is a flowchart describing a GetOptions response transmission process according to the first embodiment of the present invention.

FIG. 7 is a flowchart describing a GetOptions response transmission process of transmitting a GetOptions response to the client apparatus 2000 in the transaction 6053, performed in the monitoring camera 1000 according to this embodiment.

This process is performed by the control unit 1001 in the description given below, the parameters of WDR and DC in ImagingSettings are referred to, and the other parameters are not referred to.

In step S7000, the control unit 1001 determines whether or not the value of WDR in the current image processing setting stored in the storage unit 1002 is ON. Further, the control unit 1001 determines whether or not the value of DC in the image processing setting is OFF.

In a case where the control unit 1001 determines that the value of WDR in the current image processing setting stored in the storage unit 1002 is ON and that the value of DC in the image processing setting is OFF, the process proceeds to step S7001.

On the other hand, in a case where the control unit 1001 determines that the value of WDR in the current image processing setting stored in the storage unit 1002 is not ON or that the value of DC in the image processing setting is not OFF, the process proceeds to step S7003.

The control unit 1001 according to this embodiment corresponds to a determining unit that determines which of the exposure compensating unit 1005 and the WDR image synthesizing unit 1006 is being operated, in accordance with the values of WDR and DC in the current image processing setting stored in the storage unit 1002.

Here, the value of WDR in the current image processing setting stored in the storage unit 1002 being ON indicates that the WDR image synthesizing unit 1006 is operating. On the other hand, the value of WDR being OFF indicates that the WDR image synthesizing unit 1006 is not operating.

The value of DC in the current image processing setting stored in the storage unit 1002 being ON indicates that the exposure compensating unit 1005 is operating. On the other hand, the value of DC being OFF indicates that the exposure compensating unit 1005 is not operating.

In step S7001, the control unit 1001 first generates a GetOptions response. Subsequently, the control unit 1001 sets, as an argument of the generated GetOptions response, ImagingSettings including WDR whose value is ON or OFF, and DC whose value is AUTO or OFF.

In step S7002, the control unit 1001 instructs the communication unit 1003 to transmit the GetOptions response generated by the control unit 1001 to the client apparatus 2000 via the network.

In this embodiment, the GetOptions response transmitted in step S7002 corresponds to operation information indicating the values which the client apparatus 2000 is able to specify for WDR and DC.

In step S7003, the control unit 1001 determines whether or not the value of WDR in the current image processing setting stored in the storage unit 1002 is OFF. Further, the control unit 1001 determines whether or not the value of DC in the image processing setting is ON.

In a case where the control unit 1001 determines that the value of WDR in the current image processing setting stored in the storage unit 1002 is OFF and that the value of DC in the image processing setting is ON, the process proceeds to step S7004.

On the other hand, in a case where the control unit 1001 determines that the value of WDR in the current image processing setting stored in the storage unit 1002 is not OFF or that the value of DC in the image processing setting is not ON, the process proceeds to step S7005.

In step S7004, the control unit 1001 first generates a GetOptions response. Subsequently, the control unit 1001 sets, as an argument of the generated GetOptions response, ImagingSettings including WDR whose value is OFF, and DC whose value is ON, AUTO, or OFF.

In step S7005, the control unit 1001 first generates a GetOptions response. Subsequently, the control unit 1001 sets, as an argument of the generated GetOptions response, ImagingSettings including WDR whose value is ON or OFF, and DC whose value is ON, AUTO, or OFF.

Figure 8:
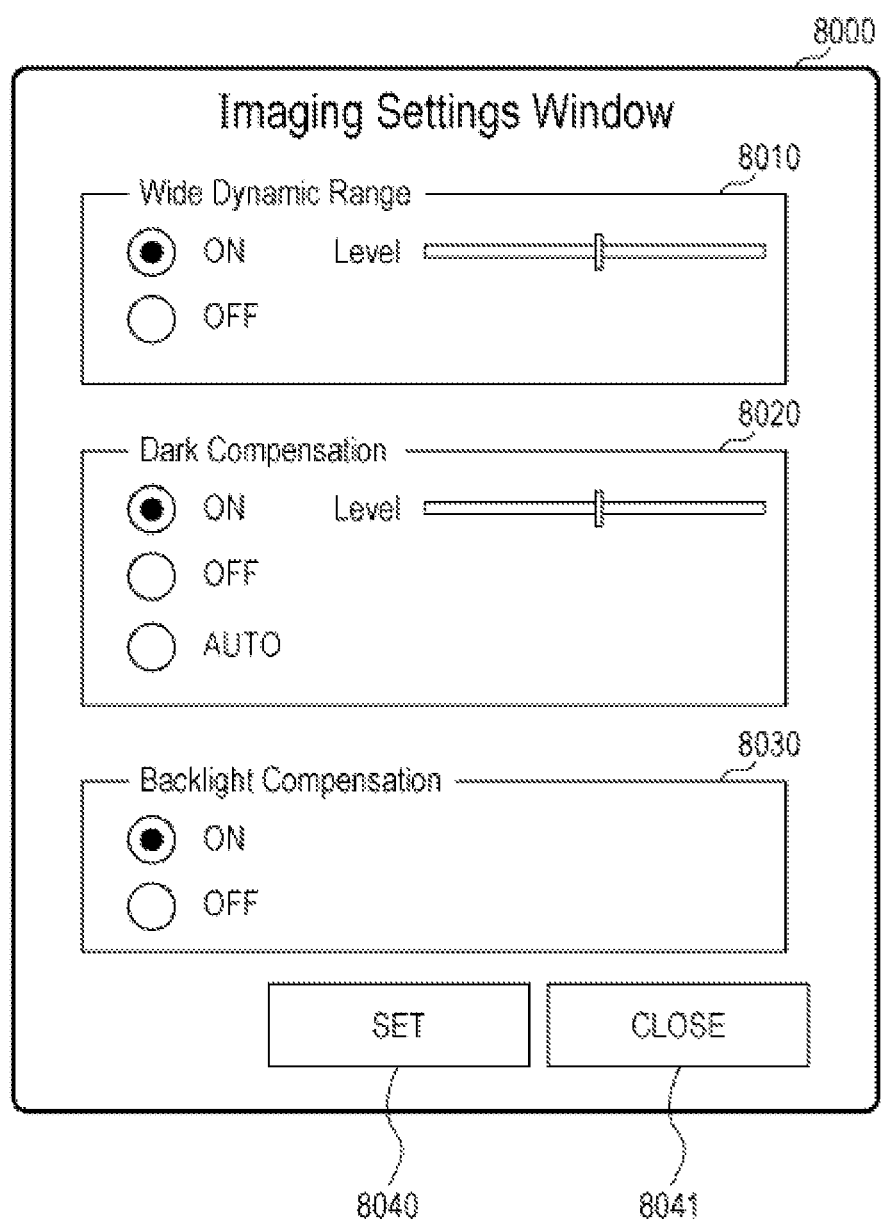
FIG. 8 is a diagram illustrating an example of an imaging settings window according to the first embodiment of the present invention.

FIG. 8 is a diagram describing an example of an imaging settings window for setting ImagingSettings of the monitoring camera 1000. This window is displayed on the display unit 2006 by the control unit 2001.

In FIG. 8, an imaging settings window 8000 includes a WideDynamicRange setting parameter input area 8010, and a DarkCompensation setting parameter input area 8020. Also, the imaging settings window 8000 includes a BacklightCompensation setting parameter input area 8030, a set button 8040, and a close button 8041.

In a case where the set button 8040 is pressed by a user, the client apparatus 2000 transmits a SetImagingSettings command corresponding to the details set on the imaging settings window 8000 to the monitoring camera 1000. Further, the client apparatus 2000 ends display of the imaging settings window 8000 upon transmission of the command.

The imaging settings window 8000 according to this embodiment corresponds to a user interface that allows a user to specify the values of WDR and DC included in the SetImagingSettings command.

In a case where the close button 8041 is pressed by the user, the client apparatus 2000 ends display of the imaging settings window 8000 without transmitting the SetImagingSettings command to the monitoring camera 1000.

Figure 9:
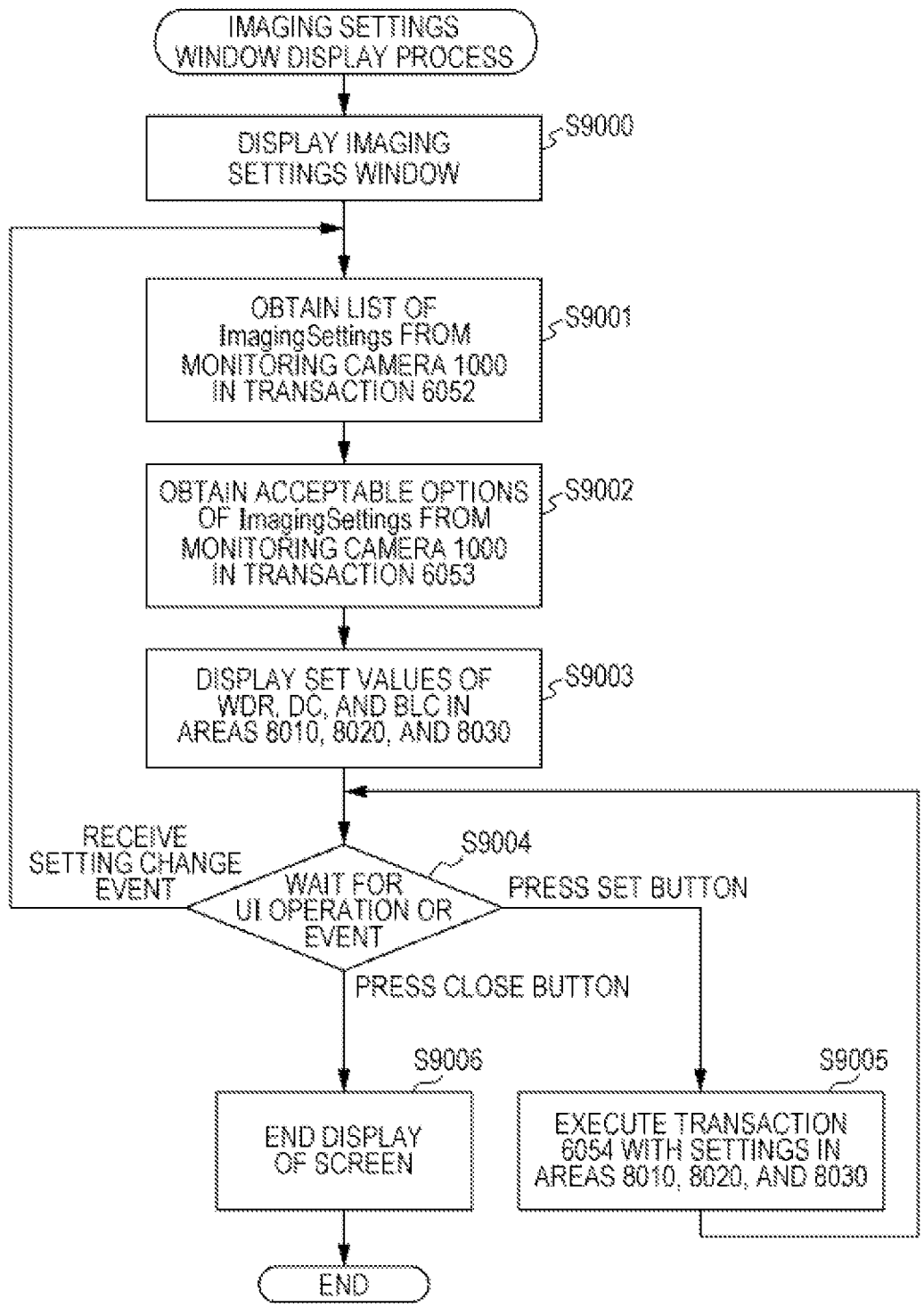
FIG. 9 is a flowchart describing an imaging settings window display process according to the first embodiment of the present invention.

FIG. 9 is a flowchart describing an imaging settings window display process performed in the client apparatus 2000 according to this embodiment. This process is performed in the client apparatus 2000 when the user of the client apparatus 2000 changes an image processing setting for an image that is distributed by streaming distribution from the monitoring camera 1000.

This process is performed by the control unit 2001. As a result of this process, the window illustrated in FIG. 8 is displayed on the display unit 2006 of the client apparatus 2000.

On the window illustrated in FIG. 8, only the values of WDR, DC, and BLC in ImagingSettings are displayed such that the values can be set, but the present invention is not limited thereto. For example, on the window illustrated in FIG. 8, the values of other parameters (or all the parameters) illustrated in FIGS. 6A to 6E may be displayed such that the values can be set.

Referring to FIG. 9, in step S9000, the control unit 2001 instructs the display unit 2006 to display the imaging settings window illustrated in FIG. 8.

In step S9001, the control unit 2001 executes the transaction 6052, so as to obtain a list of ImagingSettings from the monitoring camera 1000.

The number of ImagingSettings included in the obtained list is normally equivalent to the number of image capturing units included in a monitoring camera. The monitoring camera 1000 according to this embodiment includes one image capturing unit 1004, and thus the number of ImagingSettings included in the list obtained in step S9001 is one, but the present invention is not limited thereto.

For example, there may be a case where the list obtained in step S9001 includes a plurality of ImagingSettings because a monitoring camera includes a plurality of image capturing units. In such a case, a plurality of tabs may be provided in the window illustrated in FIG. 8, in order to switch the display of the plurality of ImagingSettings.

Alternatively, the window illustrated in FIG. 8 may be displayed for each of the plurality of ImagingSettings. For example, in a case where the list obtained in step S9001 includes two ImagingSettings, two windows, each of which is the window illustrated in FIG. 8, may be displayed for the two ImagingSettings.

In step S9002, the control units 2001 executes the transaction 6053, and thereby obtains, from the monitoring camera 1000, options that are acceptable by the monitoring camera 1000 regarding the individual parameters of ImagingSettings.

In step S9003, the control unit 2001 displays the window illustrated in FIG. 8 on the display unit 2006. Here, in accordance with the set values of WDR, DC, and BLC included in ImagingSettings obtained in step S9001, the control unit 2001 causes the radio buttons corresponding to the individual set values on the window illustrated in FIG. 8 to be selected.

Further, in accordance with the options obtained in step S9002, the control unit 2001 causes the radio buttons on the window illustrated in FIG. 8 to be displayed such that the user is not allowed to select radio buttons other than the radio buttons corresponding to the options acceptable by the monitoring camera 1000.

In step S9004, the control unit 2001 waits until any of the buttons on the window illustrated in FIG. 8 is pressed, or until the ImagingSettings setting change event in the transaction 6055 is received from the monitoring camera 1000.

In a case where the control unit 2001 determines that the set button 8040 has been pressed, the process proceeds to step S9005. In a case where the control unit 2001 determines that the close button 8041 has been pressed, the process proceeds to step S9006. In a case where the ImagingSettings setting change event in the transaction 6055 is received by the communication unit 2003, the process returns to step S9001.

In step S9005, the control unit 2001 generates a SetImagingSettings command including parameters corresponding to the radio buttons selected in the input areas 8010, 8020, and 8030. Subsequently, the control unit 2001 instructs the communication unit 2003 to transmit the generated SetImagingSettings command to the monitoring camera 1000.

In step S9006, the control unit 2001 ends display of the window illustrated in FIG. 8 on the display unit 2006.

As described above, the monitoring camera 1000 according to this embodiment is incapable of simultaneously operating both of the exposure compensating unit 1005 and the WDR image synthesizing unit 1006. Thus, among the options for specifying individual operations, options that cause an error state for the monitoring camera 1000 change in accordance with individual operation statuses.

Thus, in this embodiment, the monitoring camera 1000 is configured so as to appropriately transmit, to the client apparatus 2000, options that are normally acceptable by the monitoring camera 1000 without making an error response among the options for specifying individual operations, in accordance with the operation statuses.

Accordingly, it becomes possible to prevent a situation from occurring where a user specifies an option that causes an error state for the monitoring camera 1000 among the options for specifying the individual operations of the exposure compensating unit 1005 and the WDR image synthesizing unit 1006. As a result, the operability for the user can be increased.

In this embodiment, the control unit 1001 is configured to determine in step S7000 whether or not the value of WDR in the current image processing setting stored in the storage unit 1002 is ON. Further, in this embodiment, the control unit 1001 is configured to determine in step S7000 whether or not the value of DC in the image processing setting is OFF. However, the present invention is not limited to such a configuration.

For example, the control unit 1001 may be configured to determine in step S7000 whether or not the value of DC in the image processing setting is AUTO or OFF, instead of determining whether or not the value of DC in the image processing setting is OFF.

Further, the control unit 1001 may be configured so that the process proceeds to step S7001 in a case where the control unit 1001 determines in step S7000 that the value of WDR in the image processing setting is ON and that the value of DC in the image processing setting is AUTO or OFF.

On the other hand, the control unit 1001 may be configured so that the process proceeds to step S7003 in a case where the control unit 1001 determines in step S7000 that the value of WDR in the image processing setting is not ON and that the value of DC in the image processing setting is ON.

In this embodiment, the control unit 1001 is configured to determine in step S7003 whether or not the value of WDR in the current image processing setting stored in the storage unit 1002 is OFF. Further, in this embodiment, the control unit 1001 is configured to determine in step S7003 whether or not the value of DC in the image processing setting is ON. However, the present invention is not limited to such a configuration.

For example, it is assumed that the value of the WDR in the current image processing setting stored in the storage unit 102 can be ON, OFF or AUTO. Under such an assumption, the control unit 1001 may be configured to determine in step S7003 whether or not the value of WDR in the image processing setting is AUTO or OFF, instead of determining whether or not the value of WDR in the image processing setting is OFF.

Further, the control unit 1001 may be configured so that the process proceeds to step S8001 in a case where the control unit 1001 determines in step S7000 that the value of DC in the image processing setting is ON and that the value of WDR in the image processing setting is AUTO or OFF.

On the other hand, the control unit 1001 may be configured so that the process proceeds to step S7005 in a case where the control unit 1001 determines in step S7000 that the value of DC in the image processing setting is not ON and that the value of WDR in the image processing setting is ON.

Second Embodiment

Next, a second embodiment of the present invention will be described with reference to FIG. 10. The same elements as those in the first embodiment are denoted by the same reference numerals, and the description thereof is omitted.

In the first embodiment, a description has been given of the monitoring camera 1000 that transmits, to the client apparatus 2000, only the options that are normally acceptable by the monitoring camera 1000 among the options for specifying the individual operations of the exposure compensating unit 1005 and the WDR image synthesizing unit 1006.

Specifically, the monitoring camera 1000 according to the first embodiment is capable of eliminating, in a case where the value of one of WDR and DC in the current image processing setting stored in the storage unit 1002 is ON, the value ON from the options of the other of WDR and DC in ImagingSettings of a GetOptions response. Accordingly, the user can be provided with selectable and appropriate options.

However, in a case where the value ON is eliminated from the options of the other of WDR and DC, the user who operates the client apparatus 2000 sets the option corresponding to OFF among the options in most cases. Thus, it may be inconvenient for the user that the user is caused to select one of the options of the other of WDR and DC.

In a GetOptions response transmitted from the monitoring camera 1000 to the client apparatus 2000 according to the second embodiment, ImagingSettings that does not include options of the other of WDR and DC is set as an argument. Hereinafter, the second embodiment will be described from this viewpoint.

In step S8000, the control unit 1001 first generates a GetOptions response. Subsequently, the control unit 1001 sets, as an argument of the generated GetOptions response, ImagingSettings including WDR whose value is ON or OFF. In ImagingSettings set as an argument, the parameter of DC is omitted.

In step S8001, the control unit 1001 first generates a GetOptions response. Subsequently, the control unit 1001 sets, as an argument of the generated GetOptions response, ImagingSettings including DC whose value is ON, AUTO, or OFF. In ImagingSettings set as an argument, the parameter of WDR is omitted.

As described above, in a case where the value of one of WDR and DC in the current image processing setting stored in the storage unit 1002 is ON, the monitoring camera 1000 according to this embodiment transmits, to the client apparatus 2000, a GetOptions response for which ImagingSettings not including options of the other of WDR and DC is set as an argument.

Accordingly, the client apparatus 2000 receives, from the monitoring camera 1000, options other than options which the user hardly selects, among the options for specifying the individual operations of the exposure compensating unit 1005 and the WDR image synthesizing unit 1006. As a result, it becomes possible to prevent a situation from occurring where the user selects an option which hardly has a necessity of being selected, and thus convenience for the user can be increased.

In the above-described embodiments, it is necessary to exclusively (selectively) perform an exposure compensation process by the exposure compensating unit 1005 or a WDR process by the WDR image synthesizing unit 1006. According to the above-described embodiments, a parameter corresponding to the exposure compensation process is Dark-Compensation, but the present invention is not limited thereto.

The parameter corresponding to the exposure compensation process may be another parameter of ImagingSettings illustrated in FIGS. 6A to 6E, for example, BacklightCompensation or Exposure representing a shutter speed.

Figure 10:
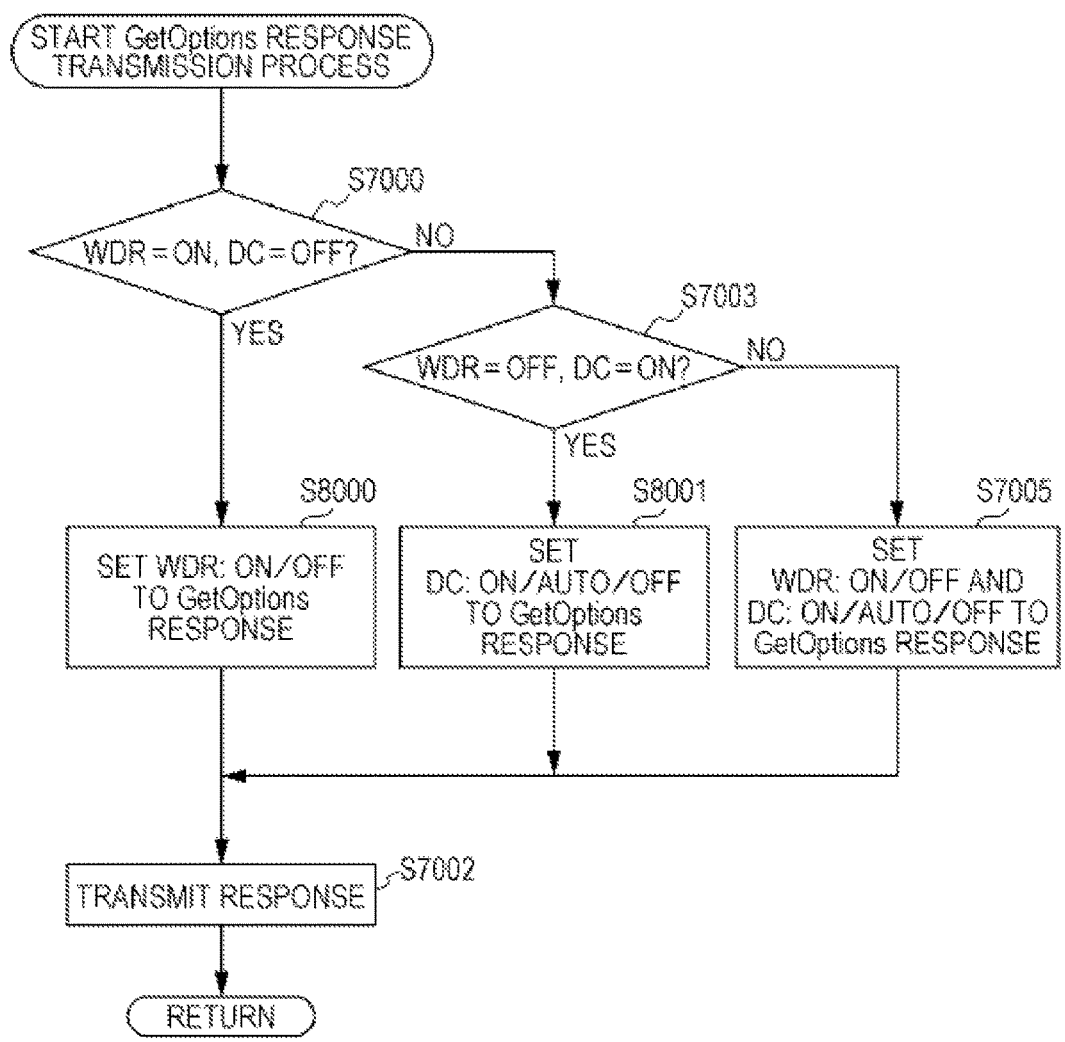
FIG. 10 is a flowchart describing a GetOptions response transmission process according to a second embodiment of the present invention.

Specifically, the control unit 1001 may be configured to use, in the flowcharts illustrated in FIGS. 7 and 10, the value of BacklightCompensation included in the image processing setting, instead of the value of DC in the image processing setting stored in the storage unit 1002. Further, the control unit 1001 may be configured to use, in these flowcharts, the value of BacklightCompensation instead of the value of DC included in ImagingSettings that is set as an argument of a GetOptions response.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, random access memory (RAM), a read only memory (ROM), a storage of distributed computing systems, an optical disc (such as a compact disc (CD), digital versatile disc (DVD), or Blu-ray Disc (BD), registered trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-223523, filed Oct. 28, 2013, which is hereby incorporated by reference herein in its entirety.

The invention claimed is:

1. An image capturing apparatus to communicate with an external apparatus via a network, the image capturing apparatus comprising:
    an image capturing unit;
    a hardware processor; and
    a memory storing instructions to be executed by the hardware processor, wherein, when the instructions stored in the memory are executed by the hardware processor, the image capturing apparatus functions as:
    a receiving unit configured to receive, from the external apparatus via the network, a synthesizing command for controlling an operation of synthesizing a plurality of images that have been captured by the image capturing unit under different exposure conditions, and an exposure setting command for controlling an operation of obtaining an image that has been generated under a set exposure condition,
    a control unit configured to selectively execute, in a case where the receiving unit receives the synthesizing command and the exposure setting command, one of a synthesizing operation and an exposure setting operation,
    a determining unit configured to determine the operation executed by the control unit, and
    a transmitting unit configured to transmit, to the external apparatus via the network, operation information indicating operations which are specifiable by the synthesizing command and the exposure setting command received by the receiving unit.

2. The image capturing apparatus according to claim 1, wherein, when the instructions stored in the memory are executed by the hardware processor, the image capturing apparatus functions as:
    a synthesizing unit configured to generate synthesized image data by being controlled by the synthesizing command, and an exposure setting unit configured to set an exposure condition for the image capturing unit to obtain a piece of image data by being controlled by the exposure setting command.

3. The image capturing apparatus according to claim 2, wherein the determining unit determines which of the synthesizing operation and the exposure setting operation is being executed by the control unit.

4. The image capturing apparatus according to claim 3, wherein, in a case where the determining unit determines that the synthesizing operation is being executed, the transmitting unit transmits, to the external apparatus via the network, operation information indicating that whether executing the synthesizing operation is specifiable by the synthesizing command, and
wherein, in a case where the determining unit determines that the exposure setting operation is being executed, the transmitting unit transmits, to the external apparatus via the network, operation information indicating that whether executing the exposure setting operation is specifiable by the exposure setting command.

5. The image capturing apparatus according to claim 4, wherein, in a case where the determining unit determines that the synthesizing operation is being executed, the transmitting unit transmits, to the external apparatus via the network, operation information indicating that not executing the exposure setting operation is specifiable by the exposure setting command.

6. The image capturing apparatus according to claim 4, wherein, in a case where the determining unit determines that the synthesizing operation is being executed, the transmitting unit transmits, to the external apparatus via the network, operation information indicating that whether the exposure setting operation is to be executed is decided by the image capturing apparatus.

7. The image capturing apparatus according to claim 4, wherein, in a case where the determining unit determines that the exposure setting operation is being executed, the transmitting unit transmits, to the external apparatus via the network, operation information indicating that not executing the synthesizing operation is specifiable by the synthesizing command.

8. The image capturing apparatus according to claim 4, wherein, in a case where the determining unit determines that the exposure setting operation is being executed, the transmitting unit transmits, to the external apparatus via the network, operation information indicating that automatic control by the image capturing apparatus of whether the synthesizing operation is to be executed is specifiable by the synthesizing command.

9. The image capturing apparatus according to claim 2, wherein, in a case where the determining unit determines that automatic control by the image capturing apparatus of whether the exposure setting operation is to be executed is specified by the exposure setting command, the transmitting unit transmits, to the external apparatus via the network, operation information indicating that whether executing the synthesizing operation is specifiable by the synthesizing command.

10. The image capturing apparatus according to claim 2, wherein, in a case where the determining unit determines that automatic control by the image capturing apparatus of whether the synthesizing operation is to be executed is specified by the synthesizing command, the transmitting unit transmits, to the external apparatus via the network, operation information indicating that whether executing the exposure setting operation is specifiable by the exposure setting command.

11. An external apparatus to communicate with an image capturing apparatus via a network, wherein the image capturing apparatus includes: an image capturing unit, an image capturing apparatus hardware processor, and an image capturing apparatus memory storing instructions to be executed by the image capturing apparatus hardware processor, wherein, when the instructions stored in the image capturing apparatus memory are executed by the image capturing apparatus hardware processor, the image capturing apparatus functions as: a control unit configured to selectively execute, in a case where the image capturing apparatus receives a synthesizing command and an exposure setting command, one of a synthesizing operation and an exposure setting operation, and a determining unit configured to determine the operation executed by the control unit, the external apparatus comprising:
an external apparatus hardware processor; and
an external apparatus memory storing instructions to be executed by the external apparatus hardware processor, wherein, when the instructions stored in the external apparatus memory are executed by the external apparatus hardware processor, the external apparatus functions as:
an external apparatus transmitting unit configured to transmit, to the image capturing apparatus via the network, a synthesizing command for controlling an operation of synthesizing a plurality of images that have been captured by the image capturing unit under different exposure conditions, and an exposure setting command for controlling an operation of obtaining an image that has been generated under a set exposure condition, and
an external apparatus receiving unit configured to receive, from the image capturing apparatus via the network, operation information indicating operations which are specifiable by the synthesizing command and the exposure setting command received by the image capturing apparatus.

12. A method to control an image capturing apparatus, having an image capturing unit, to communicate with an external apparatus via a network, the method comprising:
receiving, from the external apparatus via the network, a synthesizing command for controlling an operation of synthesizing a plurality of images that have been captured by the image capturing unit under different exposure conditions, and an exposure setting command for controlling an operation of obtaining an image that has been generated under a set exposure condition;
selectively executing, in a case where receiving includes receiving the synthesizing command and the exposure setting command, one of a synthesizing operation and an exposure setting operation;
determining the operation executed by the executing; and
transmitting, to the external apparatus via the network, operation information indicating operations which are specifiable by the received synthesizing command and the received exposure setting command.

13. The method according to claim 12, further comprising:
generating synthesized image data by being controlled by the synthesizing command; and
setting an exposure condition for the image capturing unit to obtain a piece of image data by being controlled by the exposure setting command.

14. The method according to claim 13, wherein determining includes determining which of the synthesizing operation and the exposure setting operation is being executed.

15. The method according to claim 14,
wherein, in a case where determining includes determining that the synthesizing operation is being executed, transmitting includes transmitting, to the external apparatus via the network, operation information indicating that whether executing the synthesizing operation is specifiable by the synthesizing command, and
wherein, in a case where determining includes determining that the exposure setting operation is being executed, transmitting includes transmitting, to the external apparatus via the network, operation information indicating that whether executing the exposure setting operation is specifiable by the exposure setting command.

16. The method according to claim 15,
wherein, in a case where determining includes determining that the synthesizing operation is being executed, transmitting includes transmitting, to the external apparatus via the network, operation information indicating that not executing the exposure setting operation is specifiable by the exposure setting command, and
wherein, in a case where determining includes determining that the synthesizing operation is being executed, transmitting includes transmitting, to the external apparatus via the network, operation information indicating that whether the exposure setting operation is to be executed is decided by the image capturing apparatus.

17. The method according to claim 15,
wherein, in a case where determining includes determining that the exposure setting operation is being executed, transmitting includes transmitting, to the external apparatus via the network, operation information indicating that not executing the synthesizing operation is specifiable by the synthesizing command, and
wherein, in a case where determining includes determining that the exposure setting operation is being executed, transmitting includes transmitting, to the external apparatus via the network, operation information indicating that automatic control by the image capturing apparatus of whether the synthesizing operation is to be executed is specifiable by the synthesizing command.

18. The method according to claim 13, wherein, in a case where determining includes determining that automatic control by the image capturing apparatus of whether the exposure setting operation is to be executed is specified by the exposure setting command, transmitting includes transmitting, to the external apparatus via the network, operation information indicating that whether executing the synthesizing operation is specifiable by the synthesizing command.

19. The method according to claim 13, wherein, in a case where determining includes determining that automatic control by the image capturing apparatus of whether the synthesizing operation is to be executed is specified by the synthesizing command, transmitting includes transmitting, to the external apparatus via the network, operation information indicating that whether executing the exposure setting operation is specifiable by the exposure setting command.

20. A non-transitory computer-readable storage medium storing a computer program causing an image capturing apparatus to perform the method according to claim 12.

* * * * *